No. 833,273. PATENTED OCT. 16, 1906.
G. WESTINGHOUSE.
METALLIC PACKING.
APPLICATION FILED MAY 5, 1902.

WITNESSES:
C. L. Belcher
B. B. Hines

INVENTOR
Geo. Westinghouse
BY Wesley G. Carr
ATTORNEY.

UNITED STATES PATENT OFFICE.

GEORGE WESTINGHOUSE, OF PITTSBURG, PENNSYLVANIA, ASSIGNOR TO THE WESTINGHOUSE MACHINE COMPANY, A CORPORATION OF PENNSYLVANIA.

METALLIC PACKING.

No. 833,273.

Specification of Letters Patent.

Patented Oct. 16, 1906.

Application filed May 5, 1902. Serial No. 106,009.

*To all whom it may concern:*

Be it known that I, GEORGE WESTINGHOUSE, a citizen of the United States, residing at Pittsburg, in the county of Allegheny and State of Pennsylvania, have invented a new and useful Improvement in Metallic Packings, of which the following is a specification.

My invention relates to metallic packings for rotating or reciprocating shafts, pistons, piston-rods, &c; and it has for its object to provide apparatus of this character which shall be simple in construction, effective and durable in service, and have a minimum liability to disarrangement.

Figure 1:
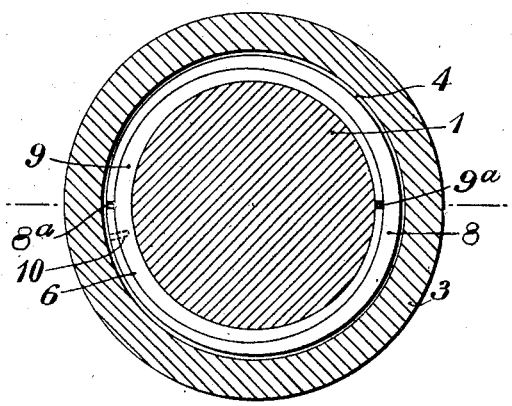
Figure 2:
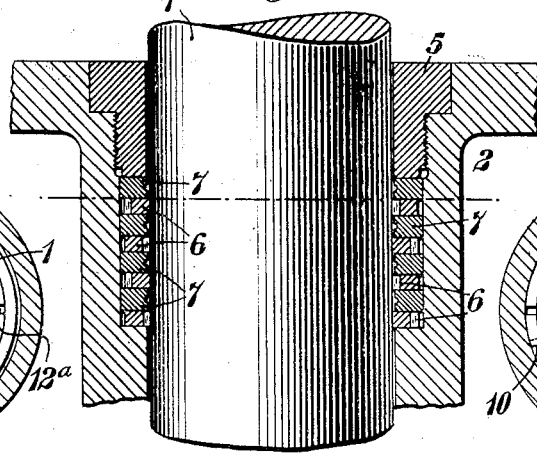
Figure 3:
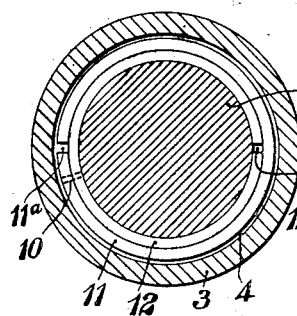
Figure 4:
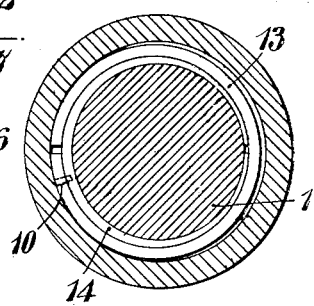
Figure 5:
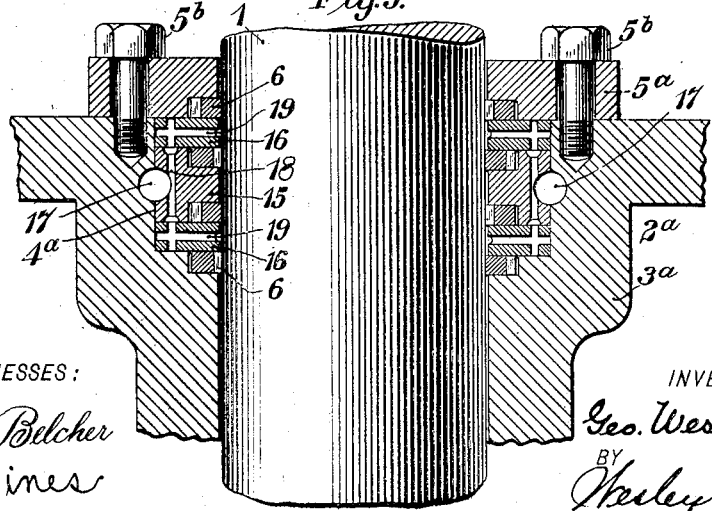

In the accompanying drawings, Figure 1 is a transverse sectional view of a piston-rod and packing-box and showing one of my compound packing-rings in elevation. Fig. 2 is a plan view of a portion of a piston-rod and a longitudinal sectional view of a packing-box provided with a series of packing and spacing rings constructed and arranged in accordance with my invention. Figs. 3 and 4 are views similar to Fig. 1, but illustrating modifications. Fig. 5 is a view similar to Fig. 2, but showing a modified construction of packing.

Referring particularly to Figs. 1 and 2, 1 is a piston-rod, which may be considered as representing any cylindrical, rotating, or reciprocating device which is to be surrounded by a suitable packing. The packing-box 2 comprises a sleeve 3, having a cylindrical recess 4 for the reception of the packing, the recess being closed at one end by means of an annular nut 5. The packing, which is located in the recess or chamber 4, comprises one or more compound rings 6 and one or more spacing-rings 7, four rings of each kind being shown in Fig. 2, though any other desired number may of course be employed. Each compound ring comprises two rings 8 and 9, each of which is of uniformly varying thickness between the extremities of a given diameter, this diameter being indicated in the present case, in Fig. 1, as a horizontal diameter. The contour of each ring is such that when the two are combined they form a compound ring of uniform thickness, and each ring is split or divided at its thinnest part, as indicated, respectively, at $8^a$ and $9^a$. The normal inner diameter of the inner ring 9 is preferably slightly less than the diameter of the shaft 1, so that it is necessary to spring the ends at $9^a$ apart in order to slip it over the shaft and so that it tightly grips the latter when in position. In the same manner the normal inner diameter of the outer ring 8 is preferably less than the outer diameter of the ring 9, so that it is necessary to spring its ends at $8^a$ apart in order to place it in position and so that it will firmly grip the ring 9. The two rings may be held in proper relative position by means of a dowel-pin 10. The spacing-rings 7, which alternate in position with the compound rings 6, as is clearly indicated in Fig. 2, are of such external diameter as to closely fit the bore of the sleeve 3 and are severally held in close contact with the adjacent compound rings 6 by means of the nut 5.

In Fig. 3 I have shown a modification in which each compound ring consists of two concentric rings 11 and 12, that are of uniform thickness and are respectively split or divided at the opposite ends of a given diameter, as indicated at $11^a$ and $12^a$. These rings may otherwise have the same characteristics and functions as the compound rings shown in Figs. 1 and 2 and may be employed in connection with similar coöperative devices.

In the modification shown in Fig. 4 each compound ring consists of an outer split ring 13, that is of uniform thickness, and an inner split ring 14, that is of uniformly varying thickness between the extremities of a given diameter. It will be understood, however, that the inner ring may be made of uniform thickness and the outer one of varying thickness, if desired. The coöperating parts may be like or similar to those shown in Figs. 1 and 2.

Referring now to Fig. 5, the shaft or rod 1 is provided with a packing-box $2^a$, consisting of a sleeve $3^a$, having a cylindrical or annular chamber $4^a$, one end of which is closed by means of an annular plate $5^a$, which is fastened to the main body of the packing-box by means of screw-bolts $5^b$. The compound rings 6 are of the same construction as those shown in Figs. 1 and 2 and already described; but the spacing-rings 15 and 16 are here shown as provided with passages through which oil may be supplied to lubricate the packing and the rod or shaft operating therein. The oil is supplied through openings or passages 17, from which it flows through passages 18 in the central spacing-ring 15 and into passages 19 in the end rings 16, the latter passages leading to the surface of the rod or shaft 1.

The form and dimensions of both the packing-rings and the spacing-rings may obviously be varied from what is shown without departing from my invention.

I claim as my invention—

1. A compound packing-ring comprising two split metal rings of substantially the same material and structure, the one within the other, and so disposed that the points of division shall be at substantially opposite extremities of a given diameter, and metal rings for holding the rings in proper relative position.

2. The combination with a shaft or rod and a packing-box therefor, of a plurality of compound, spring-metal rings clamped upon said shaft or rod within said packing-box and a plurality of metal spacing-rings alternating with said compound rings and making a close contact therewith and with the packing-box.

3. The combination with a movable, cylindrical member and a box or sleeve surrounding the same, of a plurality of compound, spring-metal rings surrounding and gripping said member within the sleeve and a plurality of metal spacing-rings alternating and in contact with the compound rings and closely fitting the cylindrical inner surface of the sleeve.

4. The combination with a rod or shaft and a box or sleeve surrounding the same, of a plurality of compound spring-metal rings surrounding and gripping said rod or shaft within the sleeve and a plurality of metal spacing-rings provided with oil-passages and alternating with the compound rings.

5. The combination with a shaft or rod and a packing box or sleeve, of a plurality of compound metal rings and a plurality of metal spacing-rings provided with oil-passages.

6. A rod or shaft packing comprising a plurality of sets of compound metallic rings, each of which sets comprises two split eccentric-rings arranged to break joints and spacer-rings alternating with said sets.

7. A rod or shaft packing comprising a plurality of sets of compound metallic rings, each of which sets comprises two split eccentric-rings arranged to break joints, and spacer-rings provided with oil-passages therethrough alternating with said sets.

In testimony whereof I have hereunto subscribed my name this 25th day of April, 1902.

GEO. WESTINGHOUSE.

Witnesses:
WM. H. CAPEL,
H. C. TENER.